United States Patent
Aboudi

(10) Patent No.: US 10,587,120 B1
(45) Date of Patent: Mar. 10, 2020

(54) SOLAR ENERGY HARVEST

(71) Applicant: Manhal Aboudi, Phoenix, AZ (US)

(72) Inventor: Manhal Aboudi, Phoenix, AZ (US)

( * ) Notice: Subject to any disclaimer, the term of this patent is extended or adjusted under 35 U.S.C. 154(b) by 154 days.

(21) Appl. No.: 15/658,378

(22) Filed: Jul. 24, 2017

(51) Int. Cl.
| | |
|---|---|
| *H02S 40/32* | (2014.01) |
| *H02S 40/38* | (2014.01) |
| *H02J 3/38* | (2006.01) |
| *H02M 3/155* | (2006.01) |
| *H02J 7/35* | (2006.01) |

(52) U.S. Cl.
CPC ............. *H02J 3/383* (2013.01); *H02S 40/32* (2014.12); *H02S 40/38* (2014.12); *H02J 7/35* (2013.01); *H02M 3/155* (2013.01)

(58) Field of Classification Search
CPC ......... H02J 3/383; H02S 40/32; H02S 40/38; H02M 3/1582; H02M 3/156
See application file for complete search history.

(56) References Cited

U.S. PATENT DOCUMENTS

| | | | | |
|---|---|---|---|---|
| 9,264,008 | B2* | 2/2016 | Bergdahl | H03H 19/004 |
| 10,033,183 | B2* | 7/2018 | Takenaka | H02M 1/126 |
| 2009/0115393 | A1* | 5/2009 | Yoshida | G05F 1/67 |
| | | | | 323/300 |
| 2013/0231797 | A1* | 9/2013 | Li | H01L 31/02021 |
| | | | | 700/297 |
| 2015/0340868 | A1* | 11/2015 | Chapman | H02J 3/383 |
| | | | | 307/82 |
| 2018/0183240 | A1* | 6/2018 | Kuwahara | H02J 3/383 |

* cited by examiner

*Primary Examiner* — Gary L Laxton
(74) *Attorney, Agent, or Firm* — Tue Nguyen

(57) ABSTRACT

A solar module can have its output processed based on the frequency responses. The high and low frequency responses can be processed separately, thus allowing the solar module to respond optimally to the rapid fluctuation of power generation, such as due to changes in weather.

13 Claims, 14 Drawing Sheets

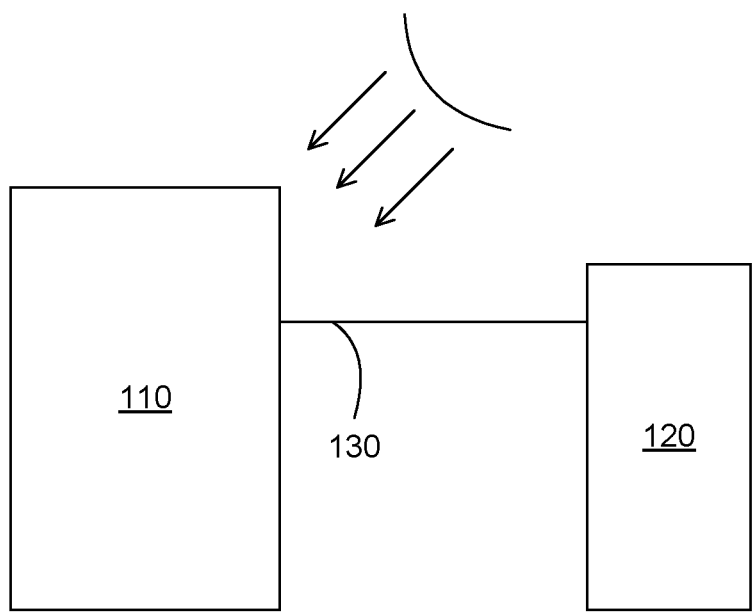
FIG. 1A
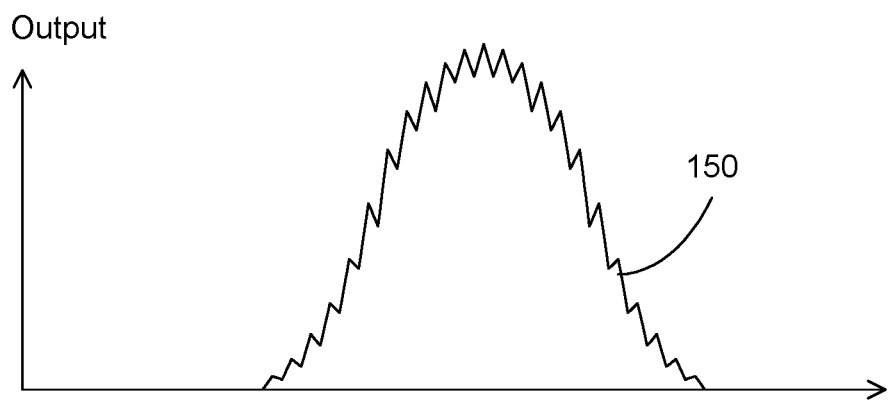
FIG. 1B
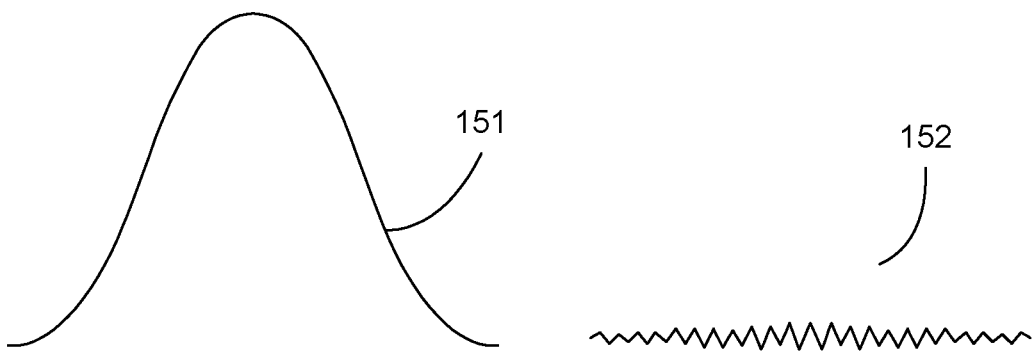
FIG. 1C  FIG. 1D

Forming an energy harvester module for a solar panel, wherein the energy harvester separately processes high frequency output and low frequency output from the solar panel
400

*FIG. 4A*

Forming an energy harvester module for a solar panel, wherein the energy harvester combines processed high and low frequency outputs from the solar panel to form an integrated output
420

*FIG. 4B*

Forming an energy harvester module for a solar panel, wherein the energy harvester uses high frequency output from the solar panel for peripheral circuits and low frequency output from the solar panel for output
440

*FIG. 4C*

Forming an energy harvester module for a solar panel, wherein the energy harvester toggles between high frequency output and low frequency output from the solar panel
460

*FIG. 4D*

Forming an energy harvester module for a solar panel, wherein the energy harvester toggles between separately processes high and low frequency outputs and a combine output from the solar panel
480

*FIG. 4E*

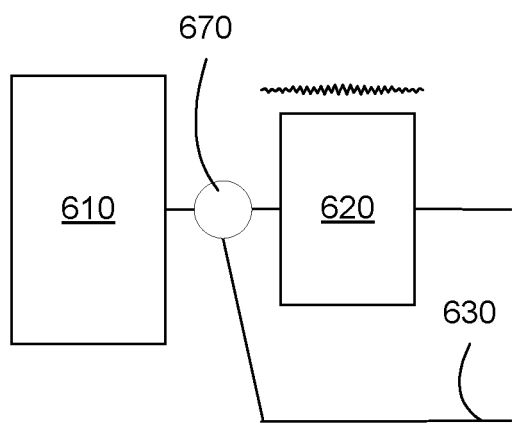
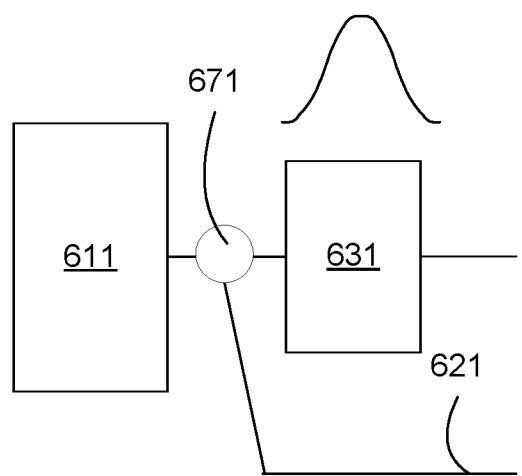
FIG. 6A     FIG. 6B
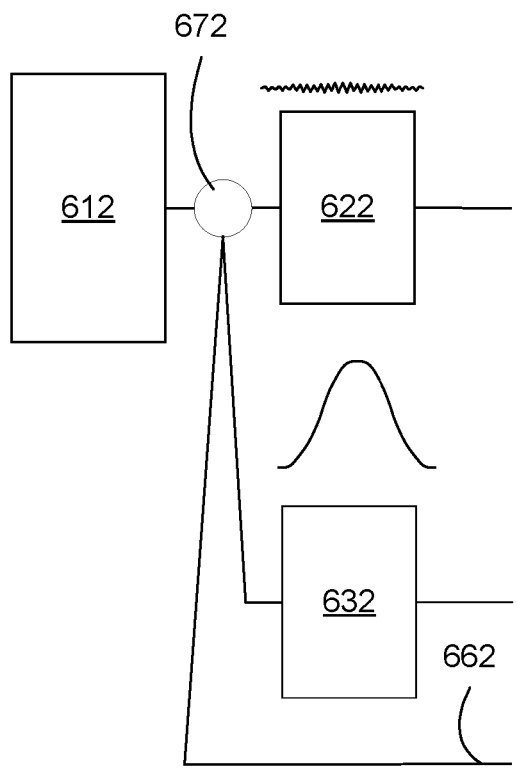
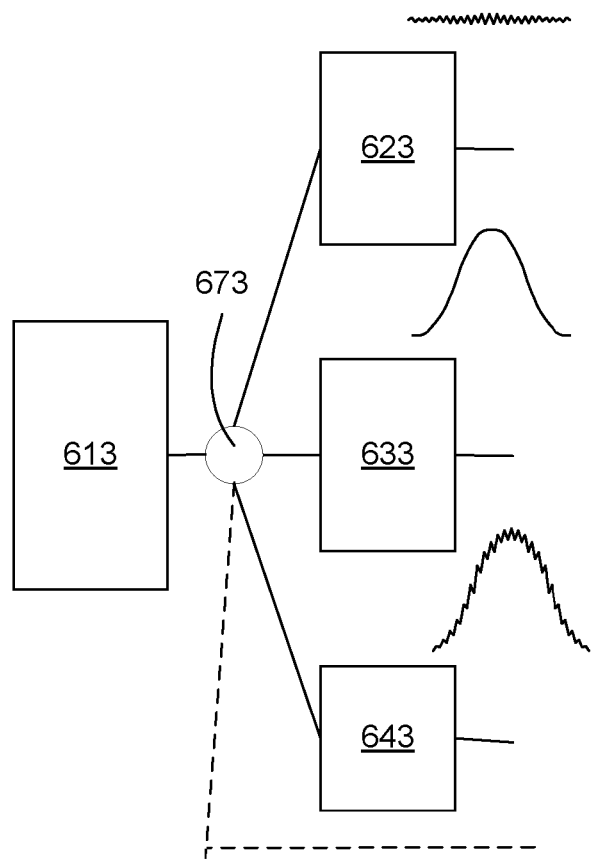
FIG. 6C     FIG. 6D

Forming a high pass filter to obtain a high frequency component from an output of a solar panel
700

FIG. 7A

Forming a low pass filter to obtain a low frequency component from an output of a solar panel
720

FIG. 7B

Forming a high pass filter to obtain a high frequency component from an output of a solar panel
740

Forming a low pass filter to obtain a low frequency component from the output of a solar panel
750

FIG. 7C

Forming a high pass filter to obtain a high frequency component and forming a low pass filter to obtain a low frequency component from an output of a solar panel
770

Forming a filter to obtain a desired frequency component from the output of a solar panel
780

FIG. 7D

Dividing a desired portion of a high frequency output of an output of a solar panel to be processed in a separate circuit
800

*FIG. 8A*

Dividing a desired portion of a low frequency output of an output of a solar panel to be processed in a separate circuit
820

*FIG. 8B*

Dividing desired portions of high and low frequency outputs of an output of a solar panel to be processed in a separate circuit
840

*FIG. 8C*

Dividing a desired portion of an output of a solar panel to be processed in a separate circuit, wherein the desired portion comprises a selected range of frequency
860

*FIG. 8D*

Optimizing a performance of a solar panel by dividing a corresponded portion of a high or low frequency output of an output of the solar panel to be processed in a separate circuit
880

*FIG. 8E*

Forming a booster circuit to increase a power obtained from a high frequency output of a solar panel
1000

FIG. 10A

Forming a booster circuit to extract power from a small high frequency output of a solar panel, wherein the booster circuit changing low voltage signals of the small high frequency output into a series of pulses at a higher voltage
1020

FIG. 10B

Forming a power harvesting module, wherein a high frequency output of a solar panel is used for powering peripheral devices of a solar module containing the solar panel
1040

FIG. 10C

Forming a power harvesting module, wherein a high frequency output of a solar panel is used for increasing a power output from a low frequency output of the solar panel
1060

FIG. 10D

Forming a bidirectional buck/booster circuit to connect an output of a solar panel to a battery and a load, wherein the bidirectional buck/booster circuit is configured to change an output voltage of the solar panel to match that of the battery, wherein the bidirectional buck/booster circuit is configured to change an output voltage of the battery to match that of the load
1200

*FIG. 12A*

Forming a power harvesting module, wherein a bidirectional buck/booster circuit is coupled to a low frequency output of a solar panel of the power harvesting module, and to a battery and a load
1220

*FIG. 12B*

Forming a power harvesting module, wherein a high frequency output and a low frequency output of a solar panel of the power harvesting module are coupled to combine the two outputs
1240

*FIG. 12C*

Forming a power harvesting module, wherein a bidirectional buck/booster circuit is coupled to an output of a sum circuit, a battery and a load, wherein the inputs of the sum circuit include a low frequency output and a high frequency output of a solar panel of the power harvesting module of the solar panel
1260

*FIG. 12D*

SOLAR ENERGY HARVEST

BACKGROUND

Solar panels can convert energy from sunlight into electricity, for example, using solar cells, e.g., photovoltaic cells, which can convert light into an electric current using the photovoltaic effect. Solar photovoltaic systems are rapidly becoming an affordable technology to harness renewable energy from the sun, leading to a rapid increase of home, commercial and utility solar panels.

The power output of a solar panel typically increase gradually from zero in the early morning when the sun rises, to a peak power at around noon, and then gradually reduces back to zero by late afternoon after the sun sets. On a clear sunny day, the power output can follow a smooth bell shape curve, following the path of the sun on the sky. On a cloudy day, there will be changes in the sun intensity reaching the solar panel, resulting in a power output fluctuation. The power output fluctuation will be random, causing changes in the bell shape curve output.

The fluctuation of the power output can be present a challenge to the solar photovoltaic system, e.g., the solar panel and the transmission/inverter assembly. For example, if the fluctuation has a high frequency, such as a fraction of 1 Hz, e.g., a period of a few seconds, the solar photovoltaic system might not respond fast enough to convert the variations of the sun intensity into useable energy. The effect can be large for larger solar farms, resulting in a criterion for selecting solar farm locations is high sun intensity and minimal weather fluctuations.

What is therefore needed is a way to address the power fluctuation from outputs of solar panels. solar photovoltaic system.

SUMMARY OF THE PREFERRED EMBODIMENTS

In some embodiments, power signals having different frequencies from an output of a solar panel can be processed differently, thus allowing the solar panel to respond optimally from a rapid change in weather conditions, such as fast moving cloud over the solar panel.

In some embodiments, the output from a solar panel can be splitted into a high frequency component and a low frequency component. After separately processed, the two components can be combined or can be used separately, to power a load or to charge a battery. The ratio of the high and low frequency components can be controlled by a switching circuitry, such as through switching duty cycles.

In some embodiments, filter circuits can be used to separate the frequency responses of the output from a solar panel. Further a direction connection can capture the signal portions that do not pass through the filters.

In some embodiments, a bi-directional buck/boost converter can be used for coupling the solar panel with a battery and a load. The bi-directional buck/boost converter can match the voltages of the battery with the solar panel output and with the load.

BRIEF DESCRIPTION OF THE DRAWINGS

FIGS. 1A-1D illustrate a solar module together with a typical power output curve according to some embodiments.
FIGS. 4A-4E illustrate configurations for energy harvester module, or solar module, according to some embodiments.
FIGS. 6A-6D illustrate configurations for circuits having different frequency responses according to some embodiments.
FIGS. 7A-7D illustrate configurations of a solar module having different frequency response circuits according to some embodiments.
FIGS. 8A-8E illustrate methods for a solar module to have different frequency responses according to some embodiments.
FIGS. 10A-10D illustrate configurations to process a high frequency portions of a solar module according to some embodiments.
FIGS. 12A-12D illustrate configurations to process a low frequency portions of a solar module according to some embodiments.

DETAILED DESCRIPTION OF THE EMBODIMENTS

Figure 2A:
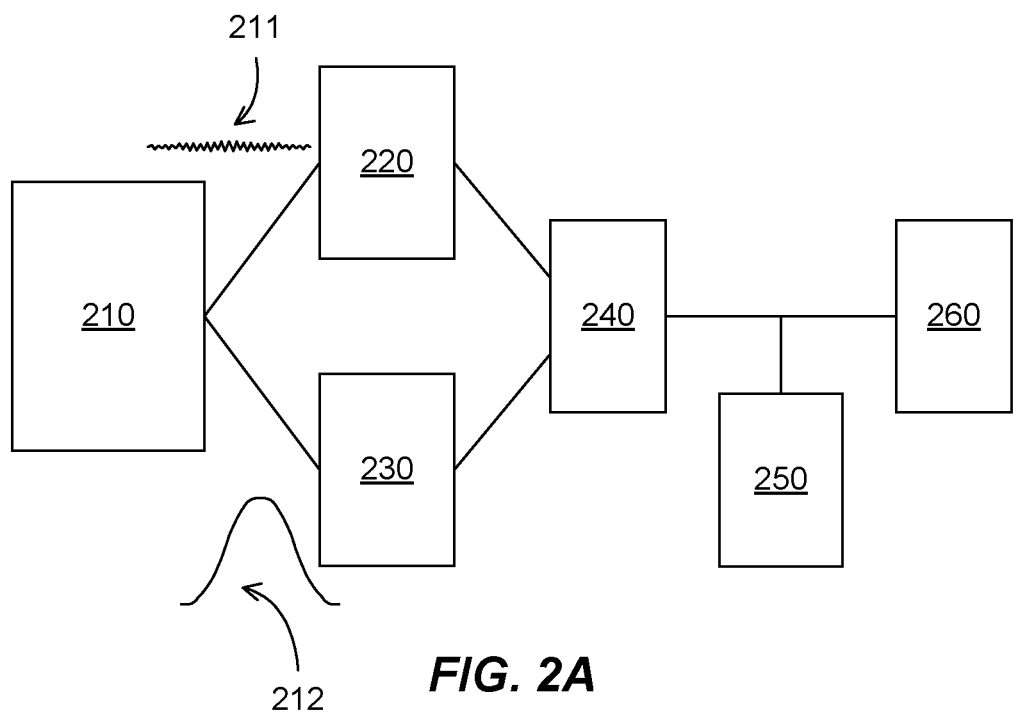
FIGS. 2A-2B illustrate solar modules with split frequency processing according to some embodiments.

A solar panel, e.g., a solar photovoltaic module, can include multiple solar cells, e.g., photovoltaic cells. The solar cells can receive sunlight to convert the sunlight energy into electricity, to be delivered to a load or to a storage module, e.g., a battery. The sunlight intensity can fluctuate during the day, resulting in a power output curve from the solar panel with high and low outputs throughout the day.

In some embodiments, the present invention discloses methods, and solar modules implementing the methods, to process the fluctuated curve of the sunlight intensity. The methods can include processing separately a high frequency output of the solar panels, which results from the fluctuation of the sunlight intensity, and a low frequency output of the solar panels, which results from the gradually change of sunlight intensity throughout the day. The terms "high and low frequencies" of the solar panel outputs are relative, meaning that the fluctuation output has a higher frequency than the gradually change output from the solar panels.

The present invention recognizes that the output from a solar panel can be considered as a combination of a slow frequency output, which is the bell shape curve typically of a clear sunny day, and a high frequency output, which is caused by the changes in weather conditions, such as cloud covering the sun, or other factors affecting the sunlight from reaching the solar panels.

FIGS. 1A-1D illustrate a solar module together with a typical power output curve according to some embodiments. In FIG. 1A, a solar panel 110 can receive sunlight from the sun, and can convert the sunlight into electricity, to be transmitted 130 to a load or a battery 120. FIG. 1B shows a typical power output 150 from the solar panel, which can include ripples in the curve, resulted from the changes in the weather. The power output 150 can be decomposed into a low frequency output portion 151 (FIG. 1C), and a high frequency output portion 152 (FIG. 1D).

The separation of the frequencies in the output portions can be selected to optimize an efficiency of the solar module, e.g., can be based on the response of the circuitry of the solar module. For example, the frequency that can be used to separate the solar output can be based on the frequency response of the solar circuitry, such as the high frequency output portion can include the frequency range that the solar circuitry cannot handle. The separate frequency, e.g., the frequency that can be used to separate a low frequency output from a high frequency output, can be less than 100 Hz, such as less than 50, 20, 10, 5, 2, 1, 0.5, 0.2. 0.1, 0.05, 0.02, 0.01, 0.005, 0.002, or 0.001 Hz.

As shown, the solar output is partitioned into two frequency portions, e.g., a low frequency portion and a high frequency portion. Other partition schemes can be used, such as dividing the solar output into three, four, or more portions, with each portion processed with different circuitry having adequately frequency response.

In some embodiments, the present invention discloses a solar power harvester, e.g., a solar module with solar panels and transmission and converter circuitry, that can adequately process the variations and fluctuations of the power output from the solar panels. The solar module can include two or more circuitries with different frequency responses, in order to handle the fluctuations in the power output of the solar panels.

In some embodiments, the solar module can include a low frequency module for processing the low frequency output from the solar panels. The low frequency output can include the fluctuation with a frequency less than 10 Hz, such as the sun coming in and out of a cloud in a time greater than every 0.1 second, such as 0.2, 0.5, 1, 2, 5, or 10 seconds. For the slow change in output generation, a typical solar module circuitry can adequately respond, and the power generated by the solar panels can be minimally affected.

The solar module can include a high frequency module for processing the high frequency output from the solar panels. The high frequency output can include the fluctuation with a frequency higher than 0.1 Hz, such as the sun coming in and out of a cloud in a time less than every 10 second, such as 5, 2, 1, 0.5, 0.2, or 0.1 seconds. The high frequency fluctuation can require different circuitry than a typical solar module circuit, in order to capture the rapid change in energy generation.

In some embodiments, the high and low frequency portions can be combined to a load or to a battery. Alternatively, the high frequency portion can be separately used, such as to power peripheral circuitries of the solar module.

Figure 2B:
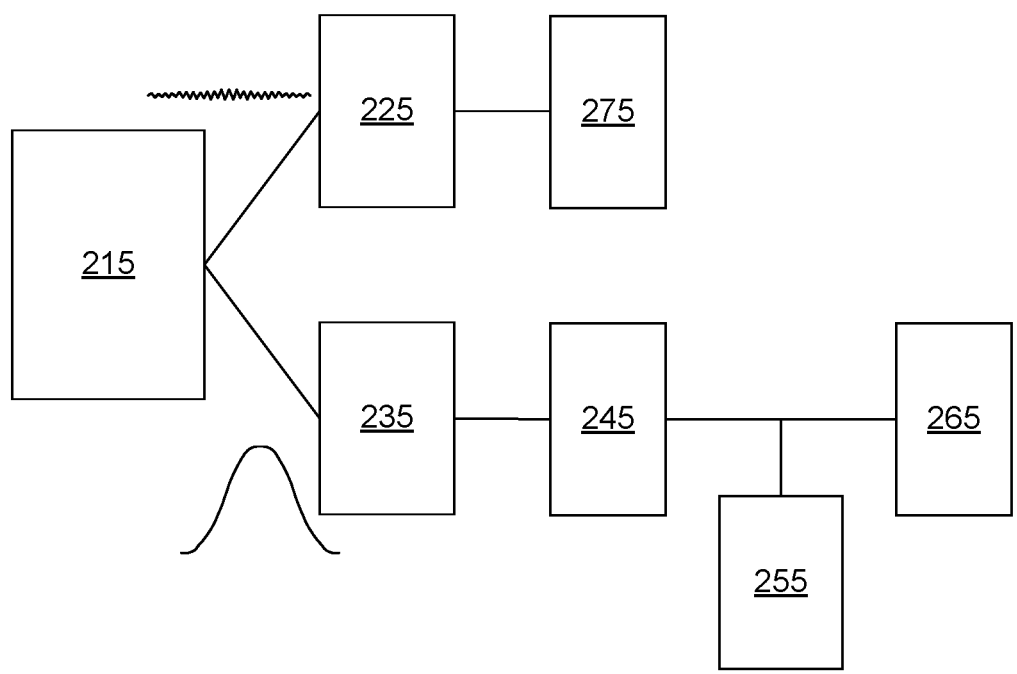

FIGS. 2A-2B illustrate solar modules with split frequency processing according to some embodiments. In FIG. 2A, the power output from a solar panel 210 is processed separately in a low frequency module 230 and in a high frequency module 220. A frequency splitter circuit (such as a low pass filter incorporated at the input to the low frequency module 230) can be used to send a low frequency output 212 of the power output from the solar panel to the low frequency module 230. The same or a different frequency splitter circuit (such as a high pass filter incorporated at the input to the high frequency module 220) can be also used to send a high frequency output 211 of the power output from the solar panel to the high frequency module 220.

After being processed, e.g., capturing the power generated by the solar panel, the different frequency outputs can be combined in a combination circuit 240, which can be used to power a load 260 or to charge a battery 250.

In FIG. 2B, the power output from a solar panel 215 is processed separately in a low frequency module 235 and in a high frequency module 225.

After being processed, e.g., capturing the power generated by the solar panel, the different frequency outputs can be used in separate circuits. For example, the low frequency output from the low frequency module 235 can be used to power a load 265 or to charge a battery 255. The high frequency output from the high frequency module 225 can be used to power peripheral circuits 275, such as a solar panel cleaning circuit, or support circuits for the solar module.

In some embodiments, the division between a low frequency portion and a high frequency portion can be time shared, e.g., the circuits can be devote a certain percentage of the total output to be processed in a high frequency module, in a low frequency module, or in other modules, such as in a module processed both high and low frequency, or in a module processed more high frequency than low frequency, or in a module processed more low frequency than high frequency.

Figure 3A:
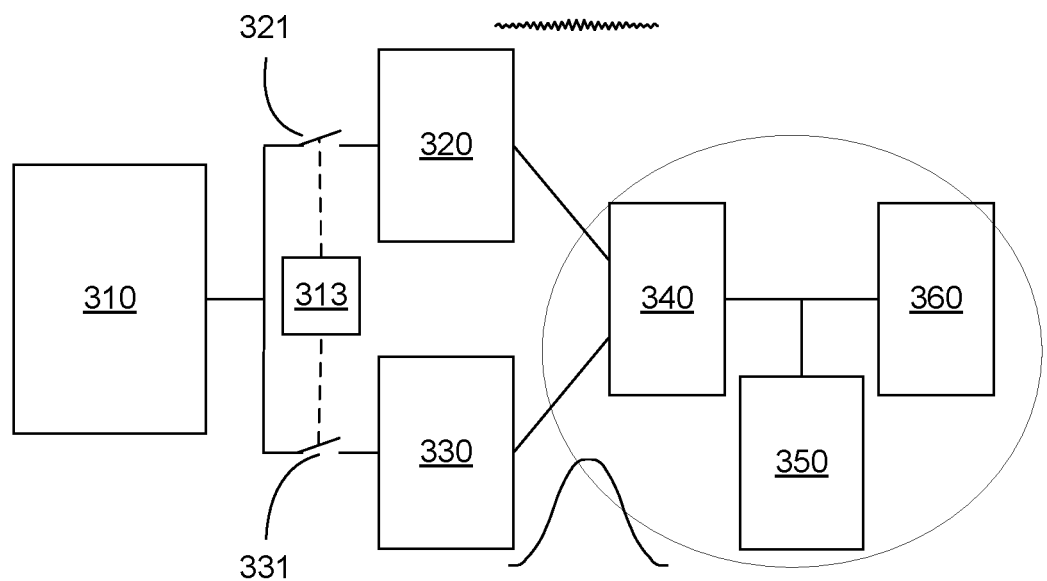
FIGS. 3A-3B illustrate configurations for divisions of outputs from a solar panel according to some embodiments.
Figure 3B:
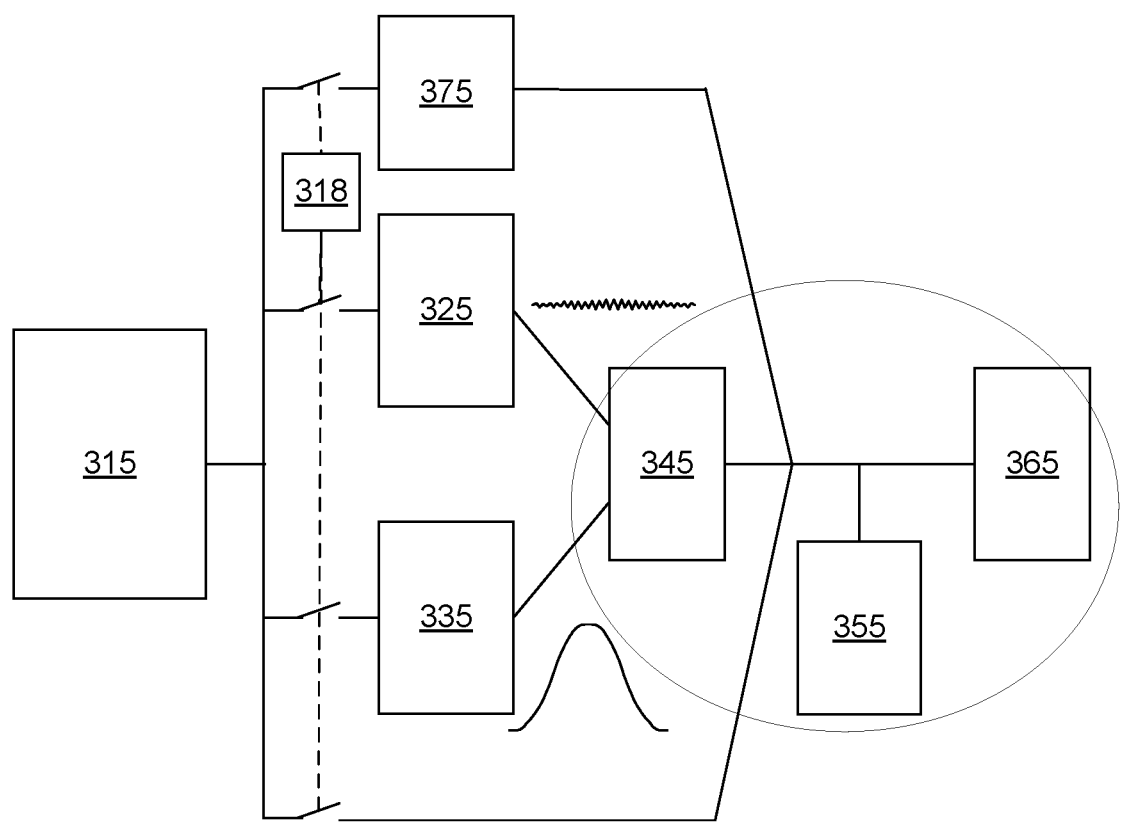

FIGS. 3A-3B illustrate configurations for divisions of outputs from a solar panel according to some embodiments. In FIG. 3A, the power output from a solar panel 310 is processed separately in a low frequency module 330 and in a high frequency module 320. After being processed, e.g., capturing the power generated by the solar panel, the different frequency outputs can be combined in a combination circuit 340, which can be used to power a load 360 or to charge a battery 350.

A division between amounts of outputs sent to the low frequency module 230 or the high frequency module 220 can be performed by a module 313. For example, the module 313 can include a circuit that generates pulse width modulation signals to control switches 321 and 331, which can govern the duty cycle of these switches, resulting in regulating the amounts of power entering the modules 220 and 230. The toggling between the high frequency module and the low frequency module can give the circuitry a degree of control on the optimization of the solar module efficiency based on the response of the solar module on the fluctuation of the sunlight intensity.

As shown, the outputs of the high and low frequency modules can be combined. However, other configurations can be used, such as the power output from the high frequency module can be used to power separate circuitries.

In FIG. 3B, the power output from a solar panel 315 is processed separately in a low frequency module 335 and in a high frequency module 325. Other modules can be included, such as a not processed module, e.g., a pass through connection for all frequency output from the solar panel, or a module 375 that can provide a different frequency response.

The module 375 can include a high frequency module at a different high frequency as compare to the high frequency cutoff of the high frequency module 225. The module 375 can include a low frequency module at a different low frequency, as compare to the low frequency cutoff of the low frequency module 235. The module 375 can include a module that allows different percentages of low frequency and high frequency to be processed, such as allowing 100% of low frequency output and 20% of high frequency output, or allowing 90% of low frequency output and 30% of high frequency output. As a comparison, the high frequency module 225 allows 100% of high frequency output to be processed. And the low frequency module 235 allows 100% of low frequency output to be processed.

After being processed, e.g., capturing the power generated by the solar panel, the different frequency outputs can be combined in a combination circuit 345, which can be used to power a load 365 or to charge a battery 355. Other configurations can be used, such as the power output from the high frequency module can be used to power separate circuitries.

A division between amounts of outputs sent to the different processing modules, such as the low frequency module 235, the high frequency module 225, the custom-designed module 375, or the module without any processing, can be performed by a module 318. For example, the module 318 can include a circuit that generates pulse width modulation signals to control the switches governing the duty cycle of signals passing to the modules, resulting in regulating the amounts of power entering the different modules. The toggling between the different modules can give the circuitry a degree of control on the optimization of the solar module efficiency based on the response of the solar module on the fluctuation of the sunlight intensity.

FIGS. 4A-4E illustrate configurations for energy harvester module, or solar module, according to some embodiments. In FIG. 4A, a solar module can have a circuit which can process the output of the solar panel of the solar module according to its frequency ranges, e.g., different frequency ranges of the solar power output can be processed differently and/or in different circuits. Thus high and low frequency portions of the power output can be addressed separately, allowing proper frequency responses in processing different frequencies in the solar output.

For example, two frequency ranges, a low frequency range portion, e.g., the solar output having frequencies lower than a cutoff frequency, and a high frequency range portion, e.g., the solar output having frequencies higher than the cutoff frequency, can be processed in two frequency circuitries. Operation 400 forms an energy harvester module for a solar panel, wherein the energy harvester separately processes high frequency output and low frequency output from the solar panel.

In FIG. 4B, a solar module can have a circuit which can process the output of the solar panel of the solar module according to its frequency ranges. After splitting the output into a high frequency portion and a low frequency portion, the processed outputs can be combined to form a combined output, e.g., a total solar output with different frequency ranges processed differently.

Operation 420 forms an energy harvester module for a solar panel, wherein the energy harvester combines processed high and low frequency outputs from the solar panel to form an integrated output In FIG. 4C, a solar module can have a circuit which can process the output of the solar panel of the solar module according to its frequency ranges. After splitting the output into a high frequency portion and a low frequency portion, the processed outputs can be used separately, such as the high frequency output can be used for supporting the solar module and the low frequency output for power generation.

Operation 440 forms an energy harvester module for a solar panel, wherein the energy harvester uses high frequency output from the solar panel for peripheral circuits and low frequency output from the solar panel for output In FIG. 4D, a solar module can have a circuit which can process the output of the solar panel of the solar module according to its frequency ranges. A module can split the output into a high frequency portion and a low frequency portion with a ratio determined by a user input. For example, a portion of the output having the high frequency range can be processed by the high frequency module. The remaining portion of the output having the high frequency range can be processed by the low frequency module, together with the output having the low frequency range. For example, a portion of the output having the high frequency range, such as 100%, 90%, 80%, 70%, 60%, 50%, 40%, 30%, 20%, 10%, or any percentage, can be processed in the high frequency module, while the remaining processed in the low frequency module.

Similarly, a portion of the output having the low frequency range can be processed by the low frequency module. The remaining portion of the output having the low frequency range can be processed by the high frequency module, together with the output having the high frequency range. For example, a portion of the output having the low frequency range, such as 100%, 90%, 80%, 70%, 60%, 50%, 40%, 30%, 20%, 10%, or any percentage, can be processed in the low frequency module, while the remaining processed in the high frequency module.

Alternatively, a portion of the output having the high frequency range can be processed by the high frequency module (the remaining portion can be processed by the low frequency module) and a portion of the output having the low frequency range can be processed by the low frequency module (the remaining portion can be processed by the high frequency module).

A splitting module can be included for performing the separation of the power output based on frequency ranges. For example, a toggling circuit, with different duty cycle controlling transistor switches can be used to perform the separation of the power output.

Operation 460 forms an energy harvester module for a solar panel, wherein the energy harvester toggles between high frequency output and low frequency output from the solar panel. The toggling process can put a first portion of the high frequency range output and a second portion of the low frequency range output into a first frequency module (such as a high frequency module), and the remaining portion of the first portion and the remaining portion of the second portion into a second frequency module (such as a low frequency module). The different outputs from the different frequency modules can be combined to form a total solar power output, or can be selectively combined, for a solar power output and a peripheral output.

In FIG. 4E, a solar module can have a circuit which can process the output of the solar panel of the solar module according to its frequency ranges. A module can split the output into multiple portions, such as a high frequency portion, a low frequency portion, and other frequency range portions, such as an all frequency portion, a high/low frequency range portion with different cutoff frequency, or a middle range frequency portion between a low cutoff frequency and a high cutoff frequency. The ratios of the different portions can be determined by a user input.

Operation 480 forms an energy harvester module for a solar panel, wherein the energy harvester toggles between separately processes multiple output portions, such as a high frequency output, a high frequency output, and an all frequency output from the solar panel. The different outputs from the different frequency modules can be combined to form a total solar power output, or can be selectively combined, for a solar power output and a peripheral output.

Figure 5A:
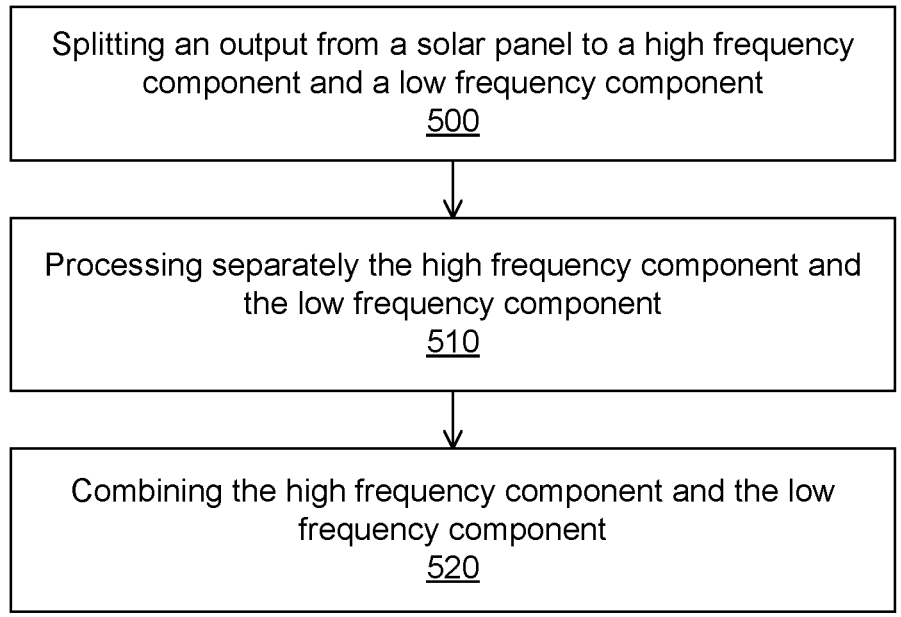
FIGS. 5A-5B illustrate methods for processing solar output in energy harvester module according to some embodiments.
Figure 5B:
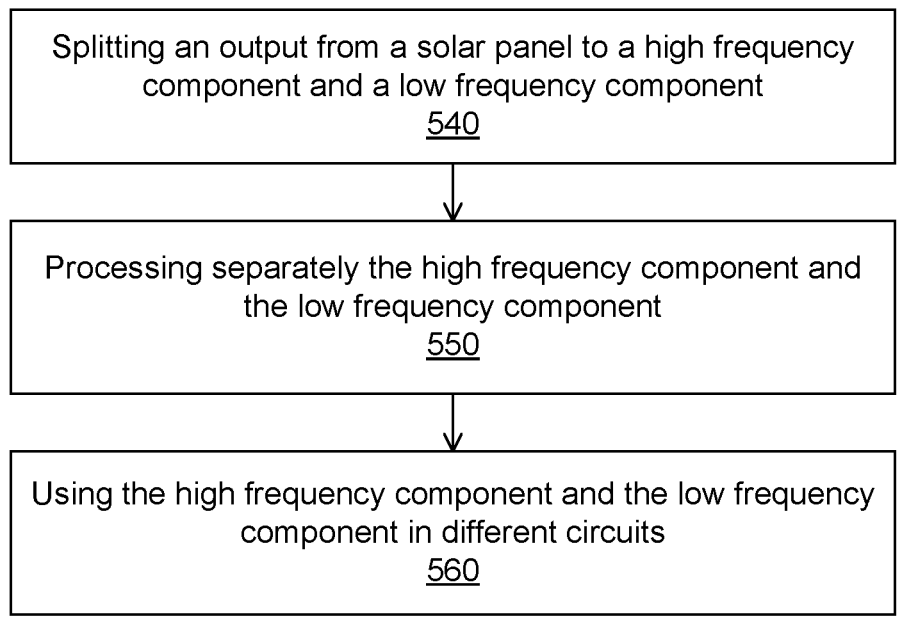

FIGS. 5A-5B illustrate methods for processing solar output in energy harvester module according to some embodiments. In FIG. 5A, a solar module can have circuits to process the power output of a solar panel according to its frequency ranges. The resulted different frequency outputs can be combined to form a total power output.

Operation 500 splits an output from a solar panel to at least a high frequency component and a low frequency component. Other frequency ranges can be used, such as a component having an all frequency range, a component having a high frequency range with a different cutoff frequency, a component having a low frequency range with a different cutoff frequency, or a component having a range of frequencies, e.g., frequencies between a low cutoff frequency and a high cutoff frequency. The splitting can be performed according to ratios determined by a user or by an optimization algorithm for maximizing a performance of the solar module.

Operation 510 processes separately the at least high frequency component and the low frequency component. Operation 520 combines the at least high frequency component and the low frequency component to form a total power output from the solar panel.

In FIG. 5B, a solar module can have circuits to process the power output of a solar panel according to its frequency ranges. The resulted different frequency outputs can be combined or can be used separately, e.g., some outputs can be combined while some output can be used separately.

Operation 540 splits an output from a solar panel to at least a high frequency component and a low frequency component. Operation 550 processes separately the at least high frequency component and the low frequency component. Operation 560 using at least some of the at least high frequency component and the low frequency component in different circuits.

In some embodiments, the splitting of the power output from a solar module can be performed using circuits having transfer functions with corresponded frequency responses, such as low pass filter circuits, high pass filter circuits, circuits with a low or high frequency cutoff transfer functions, or circuits with a predetermined frequency responses. Preferably, the circuits block other frequency ranges, e.g., allow the output to be routed to other circuits.

FIGS. 6A-6D illustrate configurations for circuits having different frequency responses according to some embodiments. In FIG. 6A, a solar panel 610 can generate a power output signal. The output signal can be routed to a high pass filter 620 (or any circuits having a frequency response that allowing the passing of high frequency components), together with a direct connection 630. High frequency components of the power output signal can pass through the high pass filter 620, while the remaining signal, e.g., the portion of the signal having frequencies less than the cutoff frequency of the high pass filter 620, can pass through the direction connection 630.

In some embodiments, the high pass filter circuit 620 can be designed to accept a portion of the high frequency components instead of all high frequency components. The remaining components can be directed to the direct connection 630.

In some embodiments, a toggling circuit 670 can be used for toggle between the high pass filter path (for high frequency components) and the direct connection path (for the remaining components). The term "toggle" can imply switching between the high pass filter path and the direction connection path. For example, a toggle switch can be used, to switch the output signal between the high pass filter path and the direction connection path. A ratio of the high pass filter path and the direction connection path can be determined by the times the switch remains in the corresponded paths. For example, if the toggle switch stays in the high pass filter path 40% of the time (e.g., the connection switch for the high pass filter path has a 40% duty cycle), and the toggle switch stays in the direction connection path 60% of the time (e.g., the connection switch for the direction connection path has a 60% duty cycle), 40% of the high frequency components can pass through the high pass filter path, and 60% of all other frequency components can pass through the direction connection path.

The term "toggle" can also imply allowing a portion of high frequency components to the high pass filter path, and the remaining portion of the high frequency component (together with the low frequency components) to pass to the direction connection path. For example, a switch can be used, to turn on or off the path from the output signal to the high pass filter path. A ratio of the high pass filter path and the direction connection path can be determined by the times the switch turning on. For example, if the switch turns on 80% of the time (e.g., the switch has a 80% duty cycle), 80% of the high frequency components can pass through the high pass filter path. The remaining 20%, together with the low frequency components can pass through the direction connection path, since the connection to the high pass filter path is turned off.

Alternatively, the switch can be implemented in the direction connection path, or two switches can be implemented in the high pass filter path and in the direction connection path.

In FIG. 6B, a solar panel 611 can generate a power output signal. The output signal can be routed to a low pass filter 631 (or any circuits having a frequency response that allowing the passing of low frequency components), together with a direct connection 621. Low frequency components of the power output signal can pass through the low pass filter 631, while the remaining signal, e.g., the portion of the signal having frequencies higher than the cutoff frequency of the low pass filter 631, can pass through the direction connection 621.

In some embodiments, the low pass filter circuit 631 can be designed to accept a portion of the low frequency components instead of all low frequency components. The remaining components can be directed to the direct connection 621.

In some embodiments, a toggling circuit 671 can be used for toggle between the low pass filter path (for low frequency components) and the direct connection path (for the remaining components). The term "toggle" can imply switching between the low pass filter path and the direction connection path. For example, a toggle switch can be used, to switch the output signal between the low pass filter path and the direction connection path. A ratio of the low pass filter path and the direction connection path can be determined by the times the switch remains in the corresponded paths. For example, if the toggle switch stays in the low pass filter path 40% of the time (e.g., the connection switch for the low pass filter path has a 40% duty cycle), and the toggle switch stays in the direction connection path 60% of the time (e.g., the connection switch for the direction connection path has a 60% duty cycle), 40% of the low frequency components can pass through the low pass filter path, and 60% of all other frequency components can pass through the direction connection path.

The term "toggle" can also imply allowing a portion of low frequency components to the low pass filter path, and the remaining portion of the low frequency component (together with the high frequency components) to pass to the direction connection path. For example, a switch can be used, to turn on or off the path from the output signal to the low pass filter path. A ratio of the low pass filter path and the direction connection path can be determined by the times the switch turning on. For example, if the switch turns on 80% of the time (e.g., the switch has a 80% duty cycle), 80% of the low frequency components can pass through the low pass filter path. The remaining 20%, together with the high frequency components can pass through the direction connection path, since the connection to the low pass filter path is turned off.

Alternatively, the switch can be implemented in the direction connection path, or two switches can be implemented in the low pass filter path and in the direction connection path.

In FIG. 6C, a solar panel 612 can generate a power output signal. The output signal can be routed to a low pass filter 632 (or any circuits having a frequency response that allowing the passing of low frequency components), a high pass filter 622 (or any circuits having a frequency response that allowing the passing of high frequency components), together with an optional direct connection 662. Low frequency components of the power output signal can pass through the low pass filter 632, high frequency components of the power output signal can pass through the high pass filter 622, while the remaining signal, such as the portion of the signal having frequencies between the cutoff frequency of the low pass filter 632 and the cutoff frequency of the high pass filter 622, can pass through the direction connection 662.

In some embodiments, the low/high pass filter circuit 632/622 can be designed to accept a portion of the low/high frequency components instead of all low/high frequency components. The remaining components can be directed to the direct connection 662.

In some embodiments, a toggling circuit 672 can be used for toggle between the low pass filter path (for low frequency components) and the direct connection path (for the remaining components). The term "toggle" can imply switching between the low pass filter path, the high pass filter path, and the direction connection path, or can imply allowing a portion of low frequency components to the low pass filter path, allowing a portion of high frequency components to the high pass filter path, and the remaining portion of the low/high frequency components to pass to the direction connection path.

In FIG. 6D, a solar panel 613 can generate a power output signal. The output signal can be routed to a low pass filter 633 (or any circuits having a frequency response that allowing the passing of low frequency components), a high pass filter 623 (or any circuits having a frequency response that allowing the passing of high frequency components), a circuit having a frequency response 643, together with an optional direct connection. Low frequency components of the power output signal can pass through the low pass filter 633, high frequency components of the power output signal can pass through the high pass filter 623, and components having appropriate frequencies can pass through the circuit 643, while the remaining signal can pass through the direction connection.

In some embodiments, the circuit 633, 623, and 643 can be designed to accept a portion of the designed frequency components instead of all frequency components. The remaining components can be directed to the direct connection.

In some embodiments, a toggling circuit 673 can be used for toggle between the low pass filter path (for low frequency components) and the direct connection path (for the remaining components). The term "toggle" can imply switching between the low pass filter path, the high pass filter path, the special frequency path, and the direction connection path, or can imply allowing a portion of low frequency components to the low pass filter path, allowing a portion of high frequency components to the high pass filter path, allowing a portion of specific frequency components to the specific frequency path, and the remaining portion to pass to the direction connection path.

FIGS. 7A-7D illustrate configurations of a solar module having different frequency response circuits according to some embodiments. In FIG. 7A, a high pass filter circuit can be formed to accept high frequency components, either all, e.g., 100%, high frequency components or a portion of the high frequency components. The remaining components, e.g., low frequency components and/or the remaining high frequency components, can pass through a direction connection. Operation 700 forms a high pass filter to obtain a high frequency component from an output of a solar panel.

In FIG. 7B, a low pass filter circuit can be formed to accept low frequency components, either all, e.g., 100%, low frequency components or a portion of the low frequency components. The remaining components, e.g., high frequency components and/or the remaining low frequency components, can pass through a direction connection. Operation 720 forms a low pass filter to obtain a low frequency component from an output of a solar panel.

In FIG. 7C, a high pass filter circuit can be formed to accept high frequency components, either all, e.g., 100%, high frequency components or a portion of the high frequency components. A low pass filter circuit can be formed to accept low frequency components, either all, e.g., 100%, low frequency components or a portion of the low frequency components. The remaining components can pass through a direction connection, or can be blocked.

Operation 740 forms a high pass filter to obtain a high frequency component from an output of a solar panel. Operation 750 forms a low pass filter to obtain a low frequency component from the output of a solar panel.

In FIG. 7D, a high pass filter circuit can be formed to accept high frequency components, either all, e.g., 100%, high frequency components or a portion of the high frequency components. A low pass filter circuit can be formed to accept low frequency components, either all, e.g., 100%, low frequency components or a portion of the low frequency components.

A special designed frequency response circuit can be formed, to obtain the components of the output having the desired frequencies. Other components can pass through a direction connection, or can be blocked.

Operation 770 forms a high pass filter to obtain a high frequency component and forming a low pass filter to obtain a low frequency component from an output of a solar panel. Operation 780 forms a filter to obtain a desired frequency component from the output of a solar panel FIGS. 8A-8E illustrate methods for a solar module to have different frequency responses according to some embodiments. A circuit with different frequency responses, e.g., different transfer functions for different frequency ranges, can be coupled to a solar panel output, to generate different power signals, e.g., voltages or currents, having the corresponded frequency ranges of the transfer functions. Thus the power output from the solar panel with different frequency ranges can be processed separately and differently, which can provide an optimized total solar output from the solar panel.

In FIG. 8A, a portion of a high frequency output, e.g., the portion of the power output from the solar panel having frequencies higher than a cutoff frequency, can be processed in a separate circuit. Operation 800 divides a desired portion of a high frequency output of an output of a solar panel to be processed in a separate circuit.

In FIG. 8B, a portion of a low frequency output, e.g., the portion of the power output from the solar panel having frequencies lower than a cutoff frequency, can be processed in a separate circuit. Operation 820 divides a desired portion of a low frequency output of an output of a solar panel to be processed in a separate circuit.

In FIG. 8C, a portion of a high frequency output, e.g., the portion of the power output from the solar panel having frequencies higher than a cutoff frequency, can be processed in a separate circuit. Another portion of a low frequency output, e.g., the portion of the power output from the solar panel having frequencies lower than a cutoff frequency, can be processed in a separate circuit. Operation 840 divides desired portions of high and low frequency outputs of an output of a solar panel to be processed in a separate circuit In FIG. 8D, a portion of a particular frequency range output, e.g., the portion of the power output from the solar panel having frequencies within the particular frequency range (frequencies between a low cutoff frequency and a high cutoff frequency), can be processed in a separate circuit. Operation 860 divides a desired portion of an output of a solar panel to be processed in a separate circuit, wherein the desired portion comprises a selected range of frequency.

In FIG. 8D, performance of a solar module can be optimized by processing different frequency portions of the power output separately. An optimization algorithm can be formed, by varying the frequency responses of different circuits in the solar module. Operation 880 optimizes a performance of a solar panel by dividing a corresponded portion of a high and/or low frequency output of an output of the solar panel to be processed in separate circuits.

In some embodiments, the high frequency output of the power output from a solar panel, e.g., the portion of the power output having frequencies above a cutoff frequency, can be processed before being used. For example, the high frequency output can be converted to a direct current (DC), such as to be compatible with other components of the power output. A rectifier circuit with a low pass filter can be used to convert the high frequency output into a DC signal.

The low pass filter in the rectifier circuit can be different than a low pass filter in the frequency response circuit mentioned in other parts of the description, in a sense that the low pass filter in the frequency response circuit allows components with low frequencies to pass through, while allowing the high frequency components to pass to another circuitry. In contrast, the low pass filter in a rectifier circuit can reduce the high frequency components by converting the high frequency components into an average signal.

The high frequency output can be small, thus an amplify circuit, or a boost circuit, can be used to increase the signal. Also, another booster circuit can be used to extract power from small high frequency output, such as at the output at sun rise or sun set. The booster circuit can change low voltage signals into a series of pulses at a higher voltage, in order for the output to be used.

The high frequency output can be used separately, or can be combined with other portions of the power output.

Figure 9A:
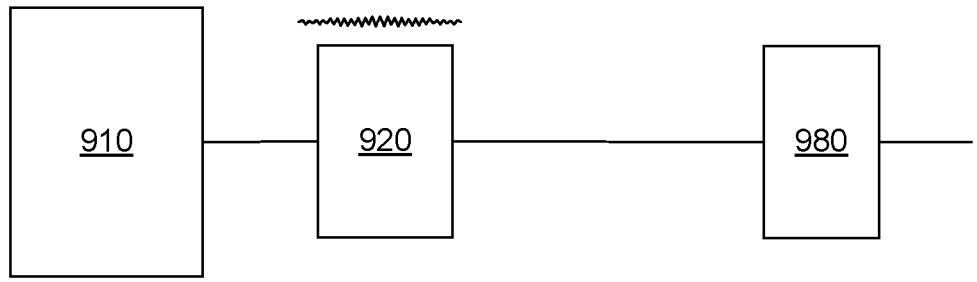
FIGS. 9A-9D illustrate configurations for high frequency outputs of a power output of a solar panel according to some embodiments.

FIGS. 9A-9D illustrate configurations for high frequency outputs of a power output of a solar panel according to some embodiments. In FIG. 9A, an output from a solar panel can be processed by a high frequency module 920, such as a high pass filter module. The output from the high pass filter, e.g., the high frequency output of the output from the solar panel 920, can be provided to a boost circuit 980 to amplify the voltage. An optional AC to DC converter can be used to convert the high frequency output into a DC output.

Figure 9B:
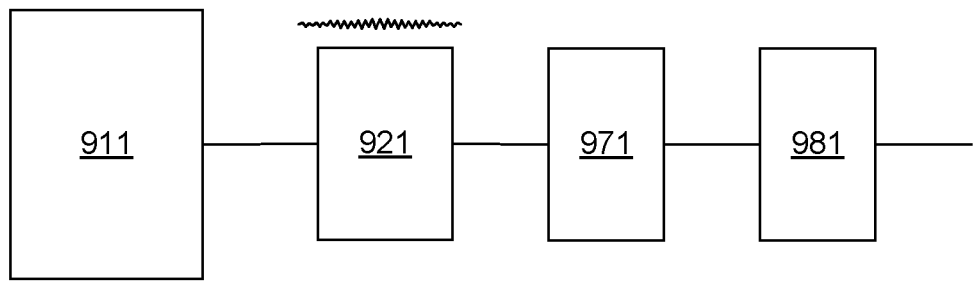

In FIG. 9B, an output from a solar panel can be processed by a high frequency module 921, such as a high pass filter module. The output from the high pass filter, e.g., the high frequency output of the output from the solar panel 921, can be provided to a first booster circuit 971 to amplify the voltage, especially from low voltage signal. The first booster circuit can include a Joule thief circuit, which can change a low voltage into a series of pulses with higher voltage. A second boost circuit 981 can be used to further amplify the voltage. The second boost circuit can include a DC-to-DC boost circuit, e.g., a DC-to-DC converter with increase voltage output. An optional AC to DC converter can be used to convert the high frequency output into a DC output.

Figure 9C:
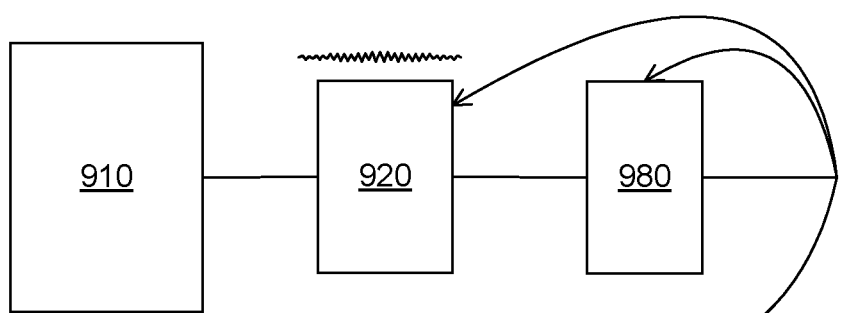

In FIG. 9C, an output from a solar panel can be processed by a high frequency module 922, such as a high pass filter module. The output from the high pass filter, e.g., the high frequency output of the output from the solar panel 922, can be provided to a boost circuit 982 to amplify the voltage. The final output can be used to supply to various circuits, such as support circuits for the solar module.

Figure 9D:
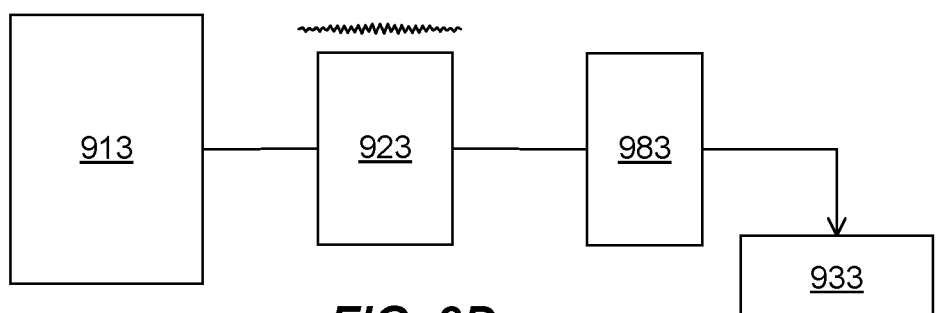

In FIG. 9D, an output from a solar panel can be processed by a high frequency module 923, such as a high pass filter module. The output from the high pass filter, e.g., the high frequency output of the output from the solar panel 923, can be provided to a boost circuit 983 to amplify the voltage. The final output can be used to combine with other portions of the solar output, such as with the low frequency output, or can be used to supply to a load or a battery 933.

FIGS. 10A-10D illustrate configurations to process a high frequency portions of a solar module according to some embodiments. In FIG. 10A, a boost circuit can be used to amplify the high frequency output. Operation 1000 forms a booster circuit to increase a power obtained from a high frequency output of a solar panel.

In FIG. 10B, multiple boost circuits can be used to amplify the high frequency output. Since the high frequency output can be small, especially at the early sun rise and at the late sun set, a pulse booster circuit can be used, which can convert the small voltage signal into a series of high voltage pulses. Afterward, a dc-to-dc boost circuit can be used to amplify the signal.

Operation 1020 forms a booster circuit to extract power from a small high frequency output of a solar panel, wherein the booster circuit changing low voltage signals of the small high frequency output into a series of pulses at a higher voltage.

In FIG. 10C, the high frequency output can be used to power peripheral circuits. Operation 1040 forms a power harvesting module, wherein a high frequency output of a solar panel is used for powering peripheral devices of a solar module containing the solar panel In FIG. 10D, the high frequency output can be used to combine with the low frequency output, e.g., to increase the power generation of the solar panel. Operation 1060 forms a power harvesting module, wherein a high frequency output of a solar panel is used for increasing a power output from a low frequency output of the solar panel.

In some embodiments, the present invention discloses a bi-directional buck/boost circuit for managing voltage mismatch in a solar module. The bi-directional buck/boost circuit can have three terminals, one for the solar panel, one for the battery, and one for the load. The bi-directional buck/boost circuit can match voltages between the solar panel and the battery, and between the battery and the load. For example, a voltage output of a solar panel can be higher or lower than the voltage of a battery. The bi-directional buck/boost circuit can match the voltages, e.g., increasing or decreasing the output voltage from the solar panel to match the voltage of the battery. Further, the voltage of the battery can be higher or lower than the voltage of a load. The bi-directional buck/boost circuit can also match the voltages, e.g., increasing or decreasing the voltage of the battery to match the voltage of the load.

In some embodiments, the bi-directional buck/boost circuit can be used for the low frequency output of an output of a solar panel, to supply low frequency output to a battery and a load.

In some embodiments, the bi-directional buck/boost circuit can be modified to accept a fourth terminal, such as from a high frequency output. The high frequency output and the low frequency output can be combined, before being supplied to the battery and the load.

Figure 11A:
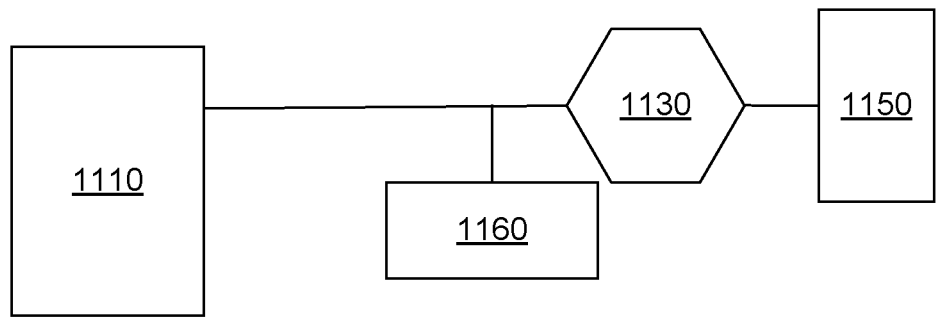
FIGS. 11A-11C illustrate configurations for low frequency outputs of a power output of a solar panel according to some embodiments.
Figure 11B:
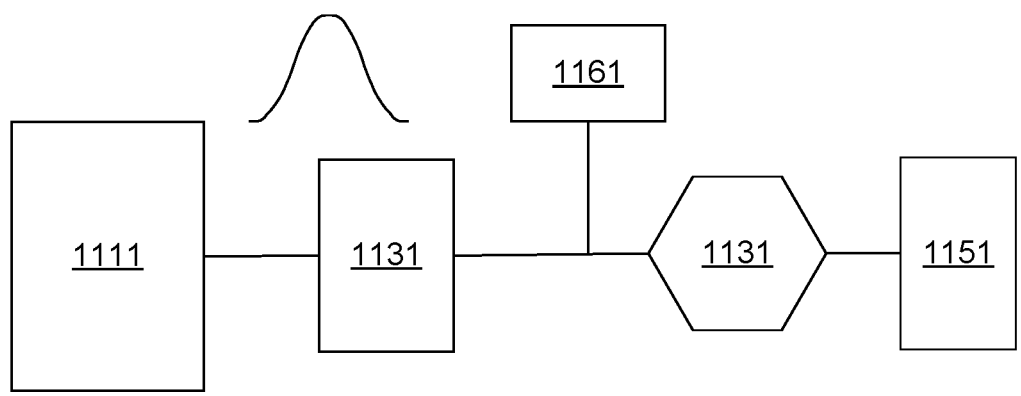
Figure 11C:
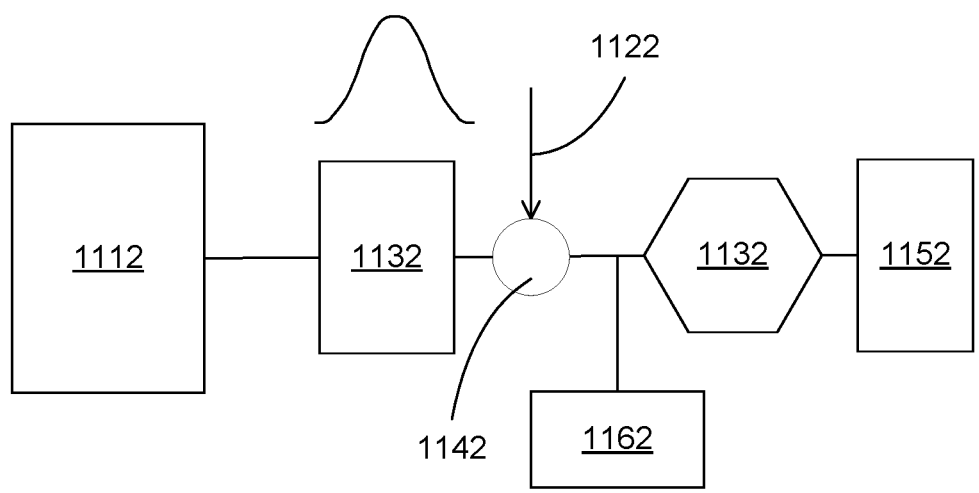

FIGS. 11A-11C illustrate configurations for low frequency outputs of a power output of a solar panel according to some embodiments. In FIG. 11A, a bi-directional buck/boost circuit 1130 can be coupled to a solar panel 1110 and a battery 1150 and a load 1160. The bi-directional buck/boost circuit can match the voltages between the three components, e.g., when the power output coming from the solar panel to the battery, and when the power coming from the battery to the load.

In FIG. 11B, a bi-directional buck/boost circuit 1131 can be coupled to a low frequency output 1131 from a solar panel 1111 and a battery 1151 and a load 1161. The bi-directional buck/boost circuit can match the voltages between the three components, e.g., when the power output coming from the low frequency output of the solar panel to the battery, and when the power coming from the battery to the load.

In FIG. 11C, a bi-directional buck/boost circuit 1132 can be coupled to a low frequency output 1132 and a high frequency output 1122 from a solar panel 1112 and a battery 1152 and a load 1162. The bi-directional buck/boost circuit can match the voltages between the three components, e.g., when the power output coming from the low frequency output of the solar panel to the battery, and when the power coming from the battery to the load. For example, a sum circuit 1142 can be added between the output of the high frequency output 1132 and the bi-directional buck/boost circuit 1132. The sum circuit can also accept the high frequency output 1122 and can add the low frequency output and the high frequency output, before bring the combination of the low and high frequency outputs to the bi-directional buck/boost circuit.

FIGS. 12A-12D illustrate configurations to process a low frequency portions of a solar module according to some embodiments. In FIG. 12A, a bidirectional buck/booster circuit can match the voltages of three components, such as between a solar output and a battery, and between the battery and a load. Operation 1200 forms a bidirectional buck/booster circuit to connect an output of a solar panel to a battery and a load, wherein the bidirectional buck/booster circuit is configured to change an output voltage of the solar panel to match that of the battery, wherein the bidirectional buck/booster circuit is configured to change an output voltage of the battery to match that of the load.

In FIG. 12B, a bidirectional buck/booster circuit can match the voltages of three components, such as between a low frequency output of a solar output and a battery, and between the battery and a load. Operation 1220 forms a power harvesting module, wherein a bidirectional buck/booster circuit is coupled to a low frequency output of a solar panel of the power harvesting module, and to a battery and a load.

In FIG. 12C, high and low frequency outputs from a solar power output can be combined, for example, through a sum circuit. Operation 1240 forms a power harvesting module, wherein a high frequency output and a low frequency output of a solar panel of the power harvesting module are coupled to combine the two outputs.

In FIG. 12D, a bidirectional buck/booster circuit can match the voltages of three components, such as between a sum of low and high frequency outputs of a solar panel and a battery, and between the battery and a load. Operation 1260 forms a power harvesting module, wherein a bidirectional buck/booster circuit is coupled to an output of a sum circuit, a battery and a load, wherein the inputs of the sum circuit include a low frequency output and a high frequency output of a solar panel of the power harvesting module of the solar panel.

In some embodiments, the present invention discloses a solar module in which components of the solar output having different frequency ranges can be processed differently and separately. The solar module can have at least two circuits having different frequency responses, such as a circuit having a transfer function that allows passages of low frequency components, and a circuit having a transfer function that allows passages of high frequency components. The separation of frequency components in the power output of a solar panel can allow an optimized processing of solar outputs in a rapid changed weather.

Figure 13:
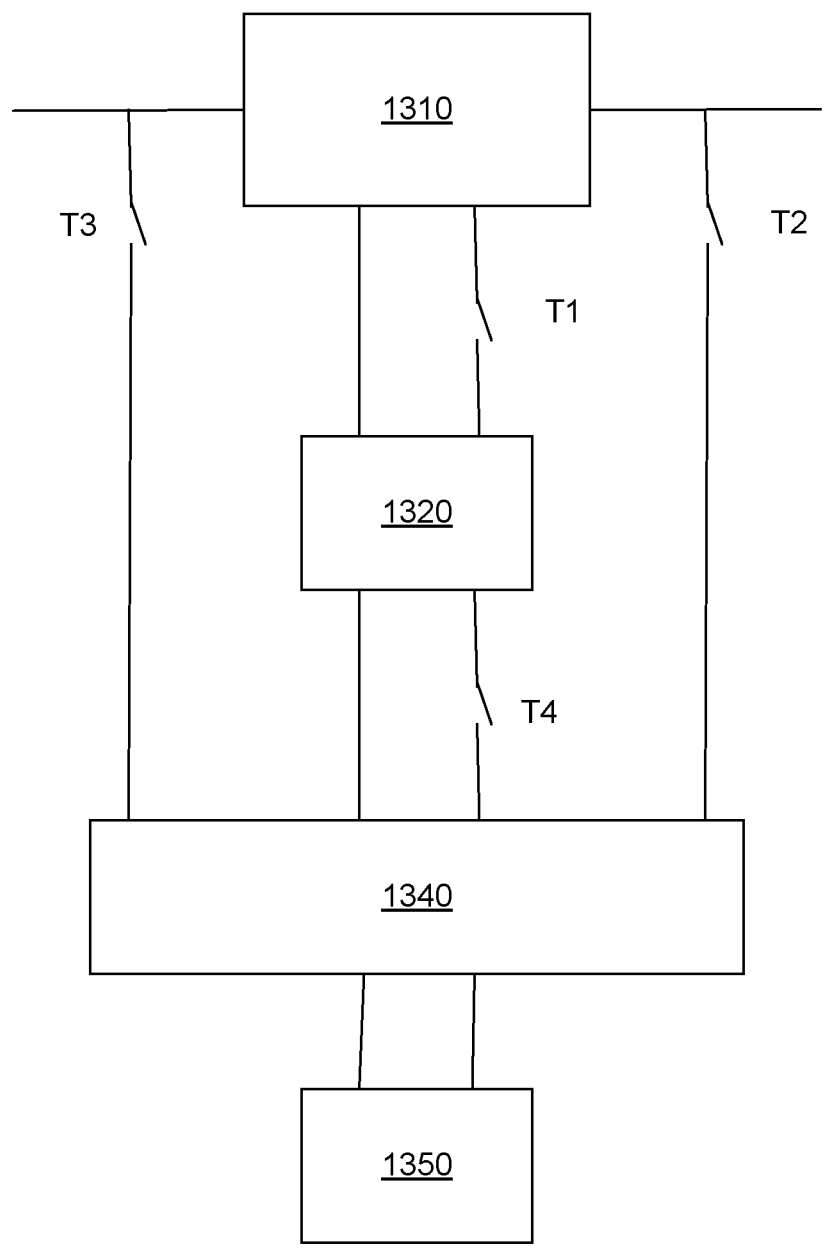
FIG. 13 illustrates a schematic of a solar module with different frequency responses according to some embodiments.

FIG. 13 illustrates a schematic of a solar module with different frequency responses according to some embodiments. A solar panel 1310 can be coupled to a high pass filter 1320 and a bi-directional buck/boost converter circuit 1340, together with a battery 1350. The output of the solar panel 1310, through switch T1, can be provided to the high pass filter 1320, resulting in an output of high frequency component, through switch T4, to be supplied to the bi-directional buck/boost converter circuit 1340. The output of the solar panel 1310 can also be supplied directly to the bi-directional buck/boost converter circuit 1340, through switches T2 and T3. Since the high frequency components of the output of the solar panel 1310 have been attracted to the high pass filter 1320, the component of the solar output through T2 and T3 can include low frequency components. The high frequency components and the low frequency components can be processed separately, and then summed up to be provided to the bi-directional buck/boost converter circuit 1340, to be supplied to the battery 1350. The bi-directional buck/boost converter circuit 1340 can match the voltages between the high/low frequency components and the battery.

The output of the solar panel can be supplied directly to a load.

Figure 14:
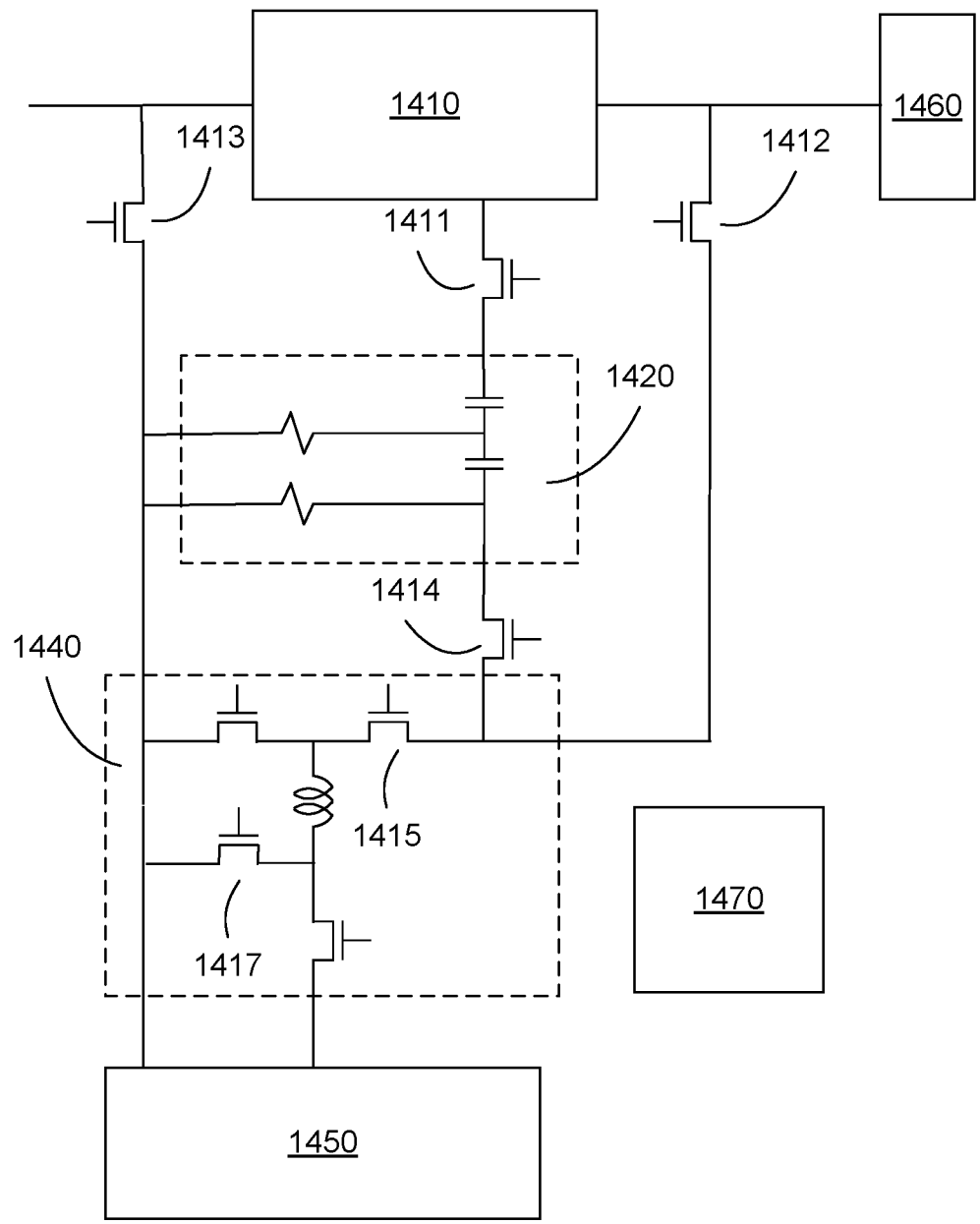
FIG. 14 illustrates a schematic of a solar module with different frequency responses according to some embodiments.

FIG. 14 illustrates a schematic of a solar module with different frequency responses according to some embodiments. A solar panel 1410 can be coupled to a high pass filter 1420 and a bi-directional buck/boost converter circuit 1440, together with a battery 1450 and a load 1460. The output of the solar panel 1410, through switch 1411, can be provided to the high pass filter 1420, resulting in an output of high frequency component, through switch 1414, to be supplied to the bi-directional buck/boost converter circuit 1440. The output of the solar panel 1410 can also be supplied directly to the bi-directional buck/boost converter circuit 1440, through switches 1412 and 1413. Since the high frequency components of the output of the solar panel 1410 have been attracted to the high pass filter 1420, the component of the solar output through 1412 and 1413 can include low frequency components. The high frequency components and the low frequency components can be processed separately, and then summed up to be provided to the bi-directional buck/boost converter circuit 1440, to be supplied to the battery 1450. The bi-directional buck/boost converter circuit 1440 can match the voltages between the high/low frequency components and the battery. A controller 1470 can be included to control the timing and duty cycles of the switches 1411-1417.

When the solar panel 1410 is operating, there can be various modes of operation.

In mode 1, the circuit can capture the energy from the ripples (fluctuations) in the DC by turning on 1411, 1413, and 1414, while 1412 is turned off. The high pass filter 1420 will capture only the energy in the ripples due to the high pass filter.

The voltage in the battery can be calculated as $$V_{battery} = V_{solar} \times \frac{Db1}{1 - Db2}$$

where Db1 is the Duty Cycle of 1415, and Db2 is the Duty Cycle of 1417.

The bi-directional buck/boost converter will allow the voltage from the solar panel to be boosted to the level of the battery.

In mode 2, the circuit captures the energy coming from the solar panel but not from the ripple, by turning off 1411 and 1414 while turning on 1412 and 1413. In this mode, the energy is diverted from the solar panel to the battery.

In mode 3, the solar panel is off, for example, at night time, and the battery is supplying power to the load 1460. 1411 and 1414 are off while 1412 and 1413 are on, which can allow the circuit to boost the voltage from the battery and act instead of the solar panel.

In some embodiments, the present invention discloses a solar equalizer for processing a power output from a solar panel. The solar equalizer can be coupled to a solar panel for optimizing the power output of the solar panel, such as better handling rapid changes in sunlight intensity throughout the day.

The solar equalizer can be configured for frequency-dependent processing of the power output, e.g., the solar equalizer can allow the independent processing of different portions of the power output having different frequency ranges. For example, the solar equalizer can allow a separately and special treatment of the rapid fluctuation of the power output caused by the rapid change in solar intensity due to the changes in weather, in addition to a typical processing of the gradual bell shape curve of solar intensity throughout the day.

The solar equalizer can include one or more filter modules, with each filter module configured to a range of frequencies. The band of filter modules can be coupled to the power output, and an output from each of the filter module can have a different frequency range. The frequency ranges of the band of filter modules can overlapped, such as a high pass filter module with a cutoff frequency less than the cutoff frequency of a low pass filter module. A switching module can be coupled to the band of filter modules, which can determine the portion of the power output to go through the filter modules.

For example, a high pass filter module can be configured for passing through signals above a cutoff frequency. The cutoff frequency can be determined by a performance criterion of the solar module, which can depend on the local weather conditions. Typically, the cutoff frequency can be between 0.01 and 10 Hz, e.g., a cloud can block and clear a sunlight between every 100 seconds and 0.1 second. The cutoff frequency can be between 0.1 and 2 Hz, e.g., a cloud can block and clear a sunlight between every 10 seconds and 0.5 second.

A direction connection filter module can be configured for passing through signals of all frequencies, e.g., similar to a direct connection between the input and output of the direction connection filter module. Thus, in parallel with a high pass filter module, the high frequency portion of the power output can pass to the high pass filter, and the remaining of the signal can pass through the direction connection filter module. In combination with a switching module coupled to the high pass filter, a portion of the power output having high frequencies can pass through the high pass filter module, and the remaining high frequency portion together with the low frequency portion can pass through the direction connection filter module.

The portion of the power output having high frequencies can pass through the high pass filter module, determined by the switching module, can be determined by an optimization of a performance of the solar module, which can depend on the local weather conditions. Typically, the portion is between 60 and 100%, or between 80% and 100%.

The high frequency portion of the power output can be processed through a regulator circuit, a booster circuit, and a boost circuit. The regulator circuit can be configured to convert a high frequency signal into a low frequency signal, e.g., forming an average signal such as reducing or eliminating the high frequency ripples. The booster circuit can be configured to convert a voltage signal into a series of higher voltage pulses, similar to a concept of a Joule thief circuit, which is based on an Armstrong self-oscillator voltage booster. The boost circuit can be configured to amplify an input voltage into a higher output voltage.

After splitting the power output into different components with different frequency ranges, the components can be processed separately before being combined back into a total processed power output. A bidirectional buck-boost converter circuit can couple a battery with the total processed power output and a load, to match, e.g., by converting, voltages between the battery and the solar panel and the load.

In some embodiments, the present invention discloses methods for optimizing a power output of the solar panel, such as better handling rapid changes in sunlight intensity throughout the day. The methods can include equalizing components having different frequency ranges of the solar output.

For example, a power output from a solar panel can be separated into multiple components based on frequency ranges, such as a component for high frequencies (frequencies above a cutoff frequency), and a component for remaining frequencies. The separation of the power output based on the frequency ranges can allow an optimization of the solar module performance, for example, by having the capability of handling rapid changes of the power output (e.g., high frequency components of the power output) due to rapid changes in weather.

What is claimed is:

1. A solar module comprising
a solar panel configured to generate a power output;
multiple circuit modules, wherein the multiple circuit modules are coupled to the same power output of the solar panel for splitting the power output into multiple signals having frequency ranges determined by the multiple circuit modules,
wherein at least a circuit module of the multiple circuit modules comprises a filter module,
wherein at least two circuit modules of the multiple circuit modules comprise two different frequency ranges;
at least a processing circuit, wherein the processing circuit is connected to at least a circuit module of the multiple circuit module for processing a signal of the multiple signals going through the at least a circuit module;
a combination circuit, wherein the combination circuit is configured to accept signals originated from the processing circuit and from the multiple circuit modules except from the at least a circuit module to form a combined signal.

2. The solar module as in claim 1
wherein the multiple circuit modules comprises a high pass filter circuit for passing a first signal above a cutoff frequency,
wherein the multiple circuit modules comprises a passthrough circuit for passing a second signal not going through the high pass filter circuit.

3. The solar module as in claim 2
wherein the cutoff frequency is determined by an optimization of a performance of the solar module.

4. The solar module as in claim 2
wherein the cutoff frequency comprises a frequency between 0.01 and 10 Hz.

5. The solar module as in claim 2
wherein the cutoff frequency comprises a frequency between 0.1 and 2 Hz.

6. The solar module as in claim 2 further comprising
a regulator circuit directly or indirectly coupled to an output of the high pass filter circuit, wherein the regulator circuit is configured to convert a high frequency signal into a low frequency signal.

7. The solar module as in claim 2 further comprising
a booster circuit directly or indirectly coupled to an output of the high pass filter circuit, wherein the booster circuit is configured to convert a voltage signal into a series of higher voltage pulses.

8. The solar module as in claim 2 further comprising
a boost circuit directly or indirectly coupled to an output of the high pass filter circuit, wherein the boost circuit is configured to amplify an input voltage into a higher output voltage.

9. The solar module as in claim 2 further comprising
a bidirectional buck-boost converter circuit coupled to an output of the combination circuit, wherein the bidirectional buck-boost converter circuit is configured to match voltages between a battery and the solar module, and between the battery and a load.

10. The solar module as in claim 2 further comprising
a switching circuit disposed between the power output and an input of the high pass filter circuit, wherein the switching circuit controls a portion of the power output passing through the high pass filter circuit.

11. The solar module as in claim 10
wherein the portion is determined by an optimization of a performance of the solar module.

12. The solar module as in claim 10
wherein the portion is between 80 and 100%.

13. A solar module comprising
a solar panel configured to generate a power output;
a first circuit module, wherein the first circuit module is coupled to the power output, wherein the first circuit module is configured as a high pass filter module for passing a first signal having a frequency range above a cutoff frequency;
a switching circuit coupled between the power output and an input of the first circuit module, wherein the switching circuit controls a portion of the power output passing through the first circuit module;
a second circuit module, wherein the second circuit module is coupled to the power output for accepting a second signal, wherein the second signal comprises signals from the solar panel that is rejected by the first circuit module;
a combination circuit, wherein the combination circuit is configured to accept signals originated from the first and second signals;
a bidirectional buck-boost converter circuit coupled to an output of the combination circuit, wherein the bidirectional buck-boost converter circuit is configured to match voltages between a battery and the solar module, and between the battery and a load.

* * * * *